(12) United States Patent
Ahern

(10) Patent No.: US 6,769,061 B1
(45) Date of Patent: Jul. 27, 2004

(54) INVISIBLE ENCODING OF META-INFORMATION

(75) Inventor: Keith Thomas Ahern, Santa Clara, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/487,150

(22) Filed: Jan. 19, 2000

(51) Int. Cl.⁷ .............................................. G06F 1/24
(52) U.S. Cl. .................... 713/176; 713/201; 713/168; 713/200
(58) Field of Search ............................. 713/200, 201, 713/168, 176

(56) References Cited

U.S. PATENT DOCUMENTS

| | | | |
|---|---|---|---|
| 5,499,294 A | | 3/1996 | Friedman |
| 5,832,119 A | * | 11/1998 | Rhoads ........................ 382/232 |
| 5,838,814 A | * | 11/1998 | Moore ......................... 382/115 |
| 5,944,824 A | * | 8/1999 | He .............................. 713/201 |
| 5,949,885 A | * | 9/1999 | Leighton ..................... 380/54 |

FOREIGN PATENT DOCUMENTS

| | | | |
|---|---|---|---|
| EP | 0883284 A2 | 12/1998 | ............ H04N/1/32 |
| WO | 86/05294 | 9/1986 | |
| WO | 97/26732 | 7/1997 | ............ H04L/9/00 |
| WO | 98/33325 | 7/1998 | ............ H04N/7/50 |

* cited by examiner

*Primary Examiner*—Thomas R. Peeso
(74) *Attorney, Agent, or Firm*—Michael E. Schmitt

(57) ABSTRACT

Meta-information, such as a digital watermark, that is associated with a document is encoded by using characters, or sequences of characters, that are "invisible" when rendered. Characters such as spaces, tabs, carriage returns, backspaces, line feeds, and so on are used to encode the watermark. The encoded "invisible" meta-information item is preferably appended to the document. A receiving device that is compatible with this encoding is able to decode and process the meta-information, for example, to verify the contents and/or the originator of the document. A receiving device that is not compatible with this encoding will merely display or print additional "white space" corresponding to the "invisible" meta-information. By appending this invisible encoding to the document, this additional white space will occur after the display or printing of the document, in a visually unobtrusive form.

20 Claims, 4 Drawing Sheets

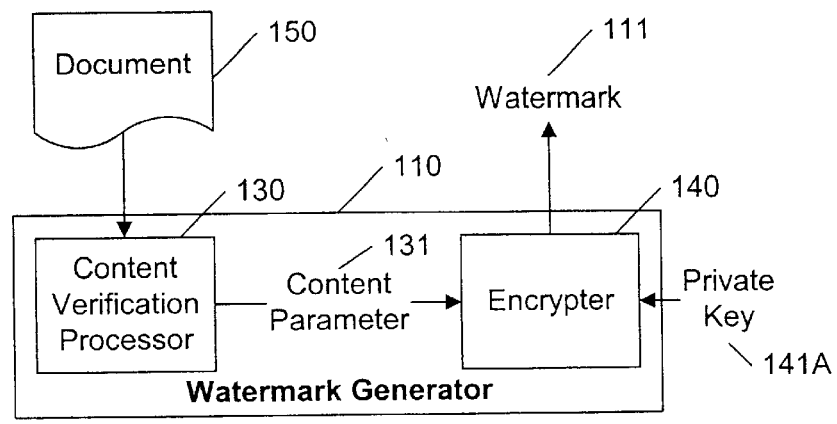
FIG. 1 [Prior Art]
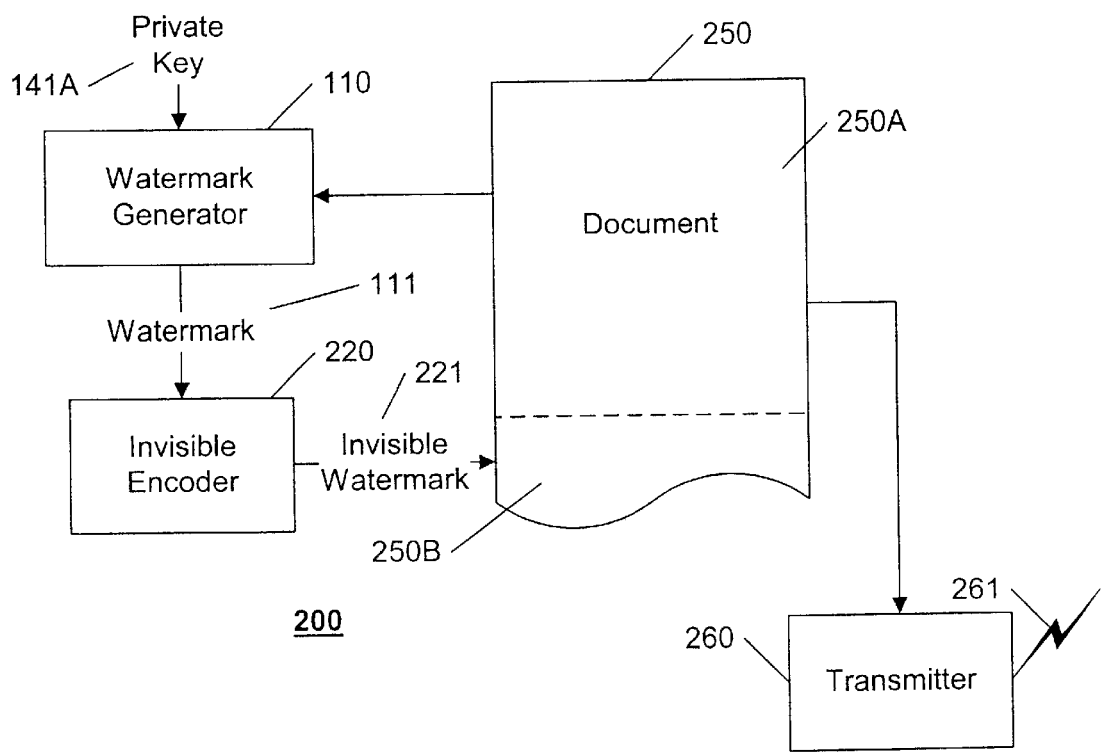
FIG. 2

INVISIBLE ENCODING OF META-INFORMATION

BACKGROUND OF THE INVENTION

1. Field of the Invention

This invention relates to the field of communications, and in particular to the encoding of meta-information, such as a digital watermark, that is related to electronic content material.

2. Description of Related Art

A watermark is traditionally used as a form of verification of the source of a document. The paper used by a particular agency for currency and other negotiable instruments typically contains a watermark that is difficult to forge; a lack of the watermark is a clear indication that the instrument was not issued by that particular agency. Some watermarks are also used to verify the content of the document, for example via the use of different watermarks for each denomination of currency. Preferably, the watermark is visually unobtrusive.

A digital watermark is used to verify the source, or originator, of electronically encoded content material, such as a text document. For ease of reference, the term document is used herein to identify the content material to which the digital watermark is applied. The digital watermark is also used to verify that the document has not been altered since the time that it was encoded by the originator. That is, the digital watermark typically comprises both a digital signature, identifying the originator, and a content verifier, although it may only contain one or the other.

A digital watermark is an example of meta-information that is associated with content material. Other examples of meta-information include, for example, a summary or abstract of the content material, an index into the content material, an identifying label or tag for identification and use by another program, such as an HTML identification tag, and so on. The digital watermark is used herein as a paradigm for meta-information that is intended to be attached to the content material in a non-intrusive fashion.

A variety of techniques are available for creating a digital watermark. A common technique for verifying both the originator and the content of a document is to have the originator encrypt the document using a private key of a public-private key pair, the document being decrypted by the public key corresponding to this public-private key pair. As the names imply, the public key is known publicly, and available to any or all recipients of the document, while only the originator knows the private key. Because only the originator knows the private key, only the originator could have encrypted a document that is decryptable by the originator's public key. Anyone having the user's public key can decrypt the document. If a recipient changes the document, the recipient will not be able to re-encrypt the modified document such that it can be decrypted by the originator's public key, because only the originator has the private key to effect such a re-encryption. Thus, the originator cannot deny sending the document, nor claim that the document has been altered.

The encryption of an entire document, merely to authenticate it, is a time and resource consuming process. Alternatively, the originator may merely encrypt only a portion of the document. Such an encryption verifies that the originator sent the document, but it does not verify that the content of the unencrypted portion of the document has not been altered. Alternatively, a parameter associated with the document, such as its length, or its "checksum", may be encrypted by the originator and communicated with the document.

FIG. 1 illustrates an example block diagram of a prior art watermark generator 110. The watermark generator 110 includes a processor 130 that determines a parameter 131 that is associated with a document 150, such as its length or checksum, and an encrypter 140 that encrypts the parameter 131 into a watermark 111, based on a private key 141A that is known only to the originator of the document 150. Using this watermark generator 110, the encryption verifies that the originator sent the document 150 having this particular length or checksum parameter 131. If the received document (not shown) has a different length or checksum, it must be an altered version of the document 150 that was sent by the originator. However, the receipt of a document having the appropriate length or checksum does not necessarily verify the document content, because a recipient of the original document can create an altered document having the same length or checksum, such as one that has transposed digits. In like manner the receipt of an encrypted length or checksum does not necessarily verify the originator of the document, because this watermark may merely be a copy of a watermark from another document from the originator having the same length or checksum.

Although not foolproof, the inclusion of a length or checksum is often used for a cursory content verification, similar to the numbering of pages in a printed document, wherein a missing page is evident. In like manner, the inclusion of an encrypted length or checksum is also often used for a cursory originator verification, similar to a person's signature, which may be forged, on a printed document.

An alternative to an inclusion of a length or checksum of a document is the inclusion of a "hash value" of the document as the parameter 131. Upon receipt, the recipient applies the same hashing function to the document without the included hash value parameter 131, and compares the resultant hash value to a decryption of the watermark 111 that is included with the document. A preferred hashing function is one that is not easily reversible and not easily determinable. That is, the creation of a modified document that has exactly the same hash value as the unmodified document is computationally difficult, and usually infeasible, task. Thus, a hash value parameter 131 of the document 150 provides an effective verification of content. The subsequent encryption of the hash value parameter 131 using the originator's private key 141A provides an effective verification of the originator, because a prior document is highly unlikely to have the same hash value parameter 131.

These, and other, methods for creating a digital watermark and other types of meta-information are common in the art. Typically, the meta-information is included within a separate section of the communicated document, using for example, a MIME, a HTML, or other encoding standard. A "tag" that identifies the start of the section, and a corresponding tag that identifies the end of the section serve to identify each section of the document, in this example, the content material and each meta-information item. A receiving application that is compatible with the encoding standard segregates the document and processes each section accordingly. For example, the material between a "Begin Text" tag and an "End Text" tag in a document will be displayed on a display device; the material between a "Begin Watermark" tag and an "End Watermark" tag will be processed to verify either the content or the originator, or both, and a corresponding document, such as "This document is verified as having been communicated from Alice" will also be displayed, or rendered as a vocal message.

A device that is not compatible with the particular standard, however, will not recognize the segmentation tags, and will typically display the document, with the included meta-information and the aforementioned tags, on a display device. Although the text will, in general, be recognizable, the inclusion of a display of the meta-information and tags is visually unappealing. In many cases, the display of this "extraneous" information has the effect of making the text of the document unrecognizable to a recipient who is not accustomed to the raw form of computer encoded documents. As noted above, an ideal metainformation item in an electronic document, on the other hand, is one that is visually unobtrusive.

BRIEF SUMMARY OF THE INVENTION

It is an object of this invention to provide a means for including a substantially "invisible" digital watermark, or other meta-information, within an electronic document. It is a further object of this invention to provide a means for encoding meta-information into an "invisible" form.

These objects and others are achieved by encoding meta-information, such as a digital watermark, using characters that are not visually apparent when the document is rendered, and attaching this encoded meta-information to the document. Characters such as spaces, tabs, carriage returns, backspaces, line feeds, and so on are used to encode the meta information. A receiving device that is compatible with this encoding is able to decode and process the meta-information; for example, to decode a watermark and verify the contents and/or the originator of the document. A receiving device that is not compatible with this encoding will merely display or print additional "white space". Preferably, by appending this invisible encoding to the document, this additional white space will occur after the display or printing of the document, in a visually unobtrusive form.

BRIEF DESCRIPTION OF THE DRAWINGS

The invention is explained in further detail, and by way of example, with reference to the accompanying drawings wherein:

FIG. 1 illustrates an example block diagram of a prior art watermark generator.

FIG. 2 illustrates an example block diagram of an encoder in accordance with this invention, using a watermark as the example meta-information.

Throughout the drawings, same reference numerals indicate similar or corresponding features or functions.

DETAILED DESCRIPTION OF THE INVENTION

Figure 3A:
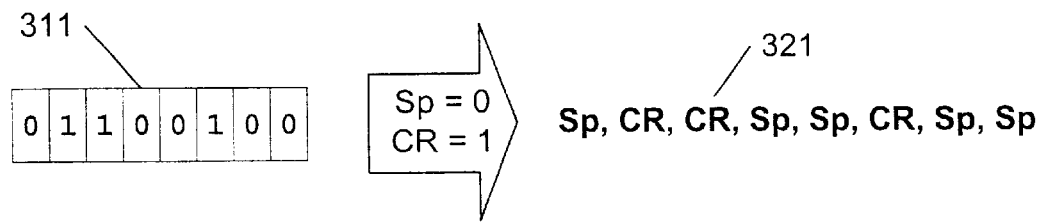
FIGS. 3A and 3B illustrate example invisible encodings of a binary digit in accordance with this invention.

FIG. 2 illustrates an example block diagram of an encoder 200 in accordance with this invention. The example encoder 200 includes an example meta-information generator and an invisible encoder 220. For ease of reference, the example watermark generator 110 of FIG. 1 is used as a representation of a typical meta-information generator. The watermark generator 110 of FIG. 1 contains both a content verification processor 130 and an encrypter 140, although some conventional watermark generators may have only one or the other, or may be configured differently than shown. As will be evident to one of ordinary skill in the art, the particular embodiment of the meta-information generator 110 is immaterial to the principles presented in this specification. For ease of understanding, hereinafter the invention is presented in terms of a digital watermark as a paradigm for meta-information, in general.

The watermark generator 110 provides a watermark 111 that is associated with the content 250A of the document 250, as discussed above with respect to FIG. 1. The invisible encoder 220 encodes the watermark 111 as a group of characters that are invisible when rendered to create an invisible watermark 221.

Figure 3B:
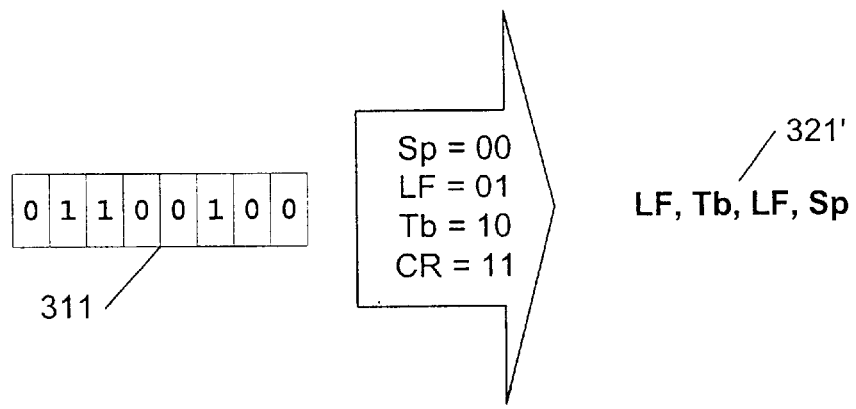

FIGS. 3A and 3B illustrate example invisible encodings of a binary digit 311 in accordance with this invention. The binary digit 311, for example, represents a single byte of the digital watermark 111 that has a binary value of "01100100". As illustrated in FIG. 3A, if a "space" character (Sp) is used to represent a bit value of "0", and a "carriage return" character (CR) is used to represent a bit value of "1", the encoding of the binary value "01100100" 311 is "Sp-CR-CR-Sp-Sp-CR-Sp-Sp" 321. The "space" and "carriage return" characters are "invisible" characters in the context of this invention, because they produce no visual affect other than "white space" on a display or printer. FIG. 3B illustrates an alternative encoding of the same binary value "01100100" using four possible "invisible" characters: "space" (Sp), "line feed" (LF), "tab" (Tb), and "carriage return" (CR), corresponding to binary pairs "00", "01", "10", and "11" respectively. As illustrated in FIG. 3B, using these four invisible representations, the binary value "01100100" 311 is "LF-Tb-LF-Sp" (01-10-01-00) 321'. Other methods of encoding values using these and other "invisible" characters, such as backspaces and the like, will be evident to one of ordinary skill in the art in view of this disclosure. Copending U.S. patent application "Invisible Encoding of Attribute Data in Character Based Documents and Files", U.S. Ser. No. 09/333,632, filed Jun. 15, 1999 for Keith Ahern, presents the encoding of attributes, such as font size, bold, italics, and so on, that affect the appearance of text elements in a document using a variety of invisible encoding techniques, and is incorporated by reference herein. For example, an alternative invisible encoding using the principles presented in the referenced copending application is the use of the "backspace" character to erase, and therefore render invisible, sequences of visible characters. In such an embodiment, for example, if the watermark 111 comprises sixty (visible) characters, the invisible watermark 221 is these sixty (visible) characters followed by, or interspersed with, sixty "backspace" characters that have the effect of erasing the visible characters from a display. These and other techniques for providing a group of characters that are invisible when rendered on a conventional display device will be obvious to one of ordinary skill in the art in view of this disclosure.

The invisible watermark 221 is appended to the content 250A of the document 250, as illustrated by segment 250B or the document 250 in FIG. 2. The term "appended" is used herein in its most general sense of "added to", the particular method used to add, merge, attach, bind, etc. the invisible watermark 221 is irrelevant to this invention. In a preferred embodiment, the invisible watermark 221 is appended to the end of the document, for ease of identification and processing, as well as to allow for the content material to be processed and presented before the watermark processing. For ease of decoding, the invisible watermark 221 includes a delineator, also invisibly encoded, that marks the beginning of the invisible watermark 221. The delineator is a predetermined encoding that is highly unlikely, preferably never, to appear within the content 250A of any document 250. For example, if spaces (S) and tabs (T) are used to invisibly encode the watermark, a sequence of "STSSTTTSTSTST", or other seemingly random assortment of invisible characters, may be used to delineate the start of the invisible watermark 221. Alternatively, the last invisible sequence in the invisible watermark 221 may contain an indication of the length of the invisible watermark 221, from which the decoder can determine the beginning of the invisible watermark 221, thereby eliminating the need for a unique delineator. These and other methods of distinguishing segments of a document are common in the art. Note that the invisible encoding need not be contiguous; for example, the invisible encoding may be placed in each corner of a document, in the margins, in the space between paragraphs, and so on.

The resultant document 250, comprising the document content 250A and an invisibly encoded watermark 250B is thereafter communicated 261 to receiving devices (not shown) via a transmitter 260. Note that by including the watermark in a virtually "invisible" form, a recipient of the document 250 will be able to view the content 250A of the document without any visually disturbing artifacts associated with the inclusion of a watermark, regardless of whether the receiving device used to receive the document 250 is capable of processing the invisibly encoded watermark. Although a user who receives the document 250 via a non-capable receiving device will not be able to process the watermark to verify the content or the originator, but will not be encumbered in viewing the document content.

Figure 4:
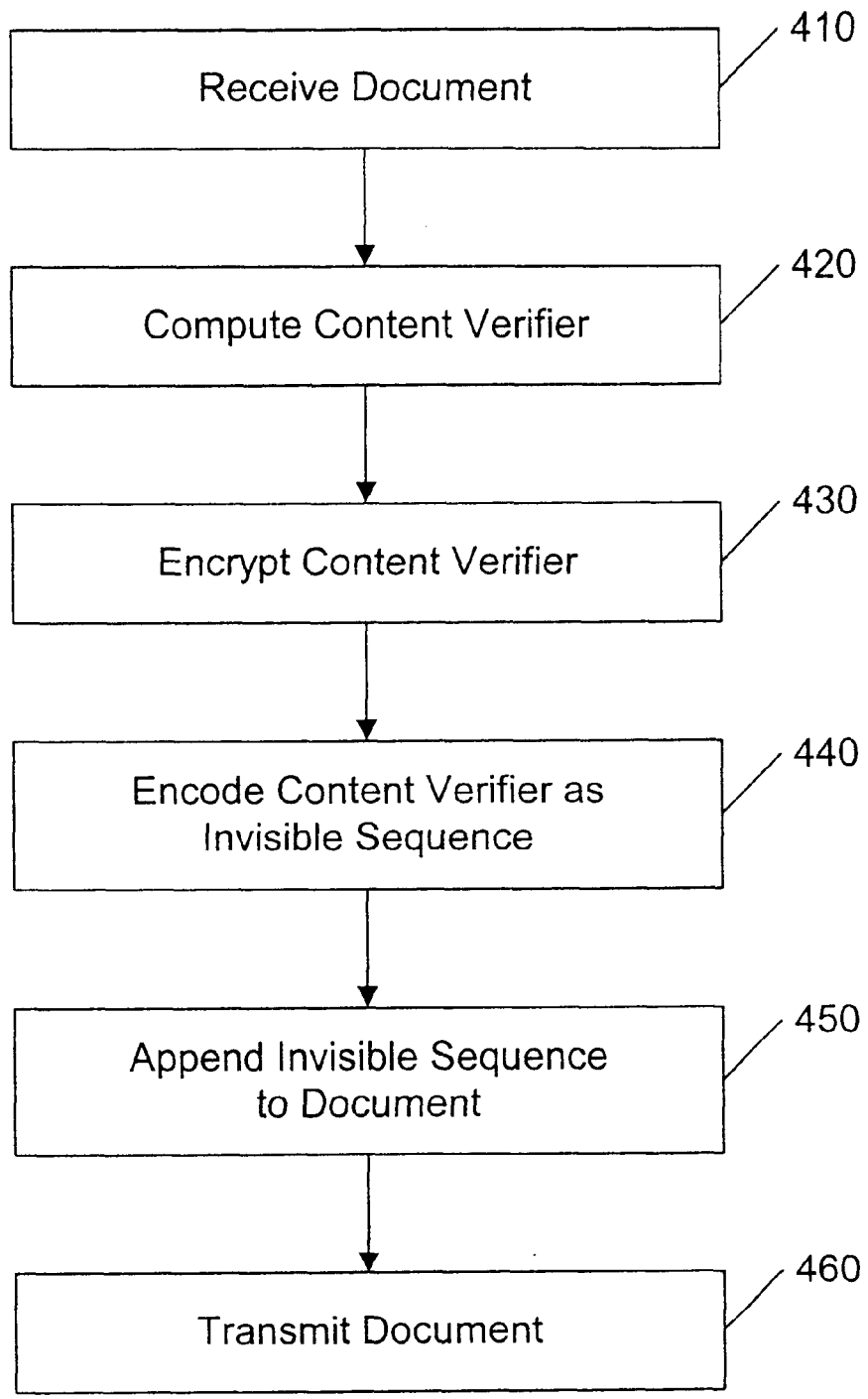
FIG. 4 illustrates an example flow diagram of an invisible watermark encoder in accordance with this invention.

FIG. 4 illustrates an example flow diagram of an invisible watermark encoder in accordance with this invention, such as might be used in the encoder 200 of FIG. 2. At 410, the document is received by the encoder, and at 420, a content verification parameter is determined, based on the content of the document. The content verification parameter is a length, a checksum, a hash value, or other parameter corresponding to the document that can be also determined by a receiver of the document, for comparison with this parameter. The content verification parameter is encrypted, at 430, preferably via a private key of a publicprivate key pair that is only known to the originator, or signer, of the document. The encrypted content verification parameter forms the watermark, and is encoded as a group of characters that are invisible when rendered, at 440, using any one of a variety of invisible encoding techniques, as discussed above with respect to FIG. 2. Note that the selected invisible encoding technique must also be known to the recipient of the document in order to utilize the invisibly encoded watermark for verification purposes. The invisible sequence corresponding to the watermark is attached to the document, at 450, and the resultant document, with attached invisible watermark, is transmitted to one or more recipients, at 460. The transmission at 460 may be, for example, a transmission of the document via the Internet, a point-to-point transmission to a particular recipient, a file transfer via a local area network, and so on.

Figure 5:
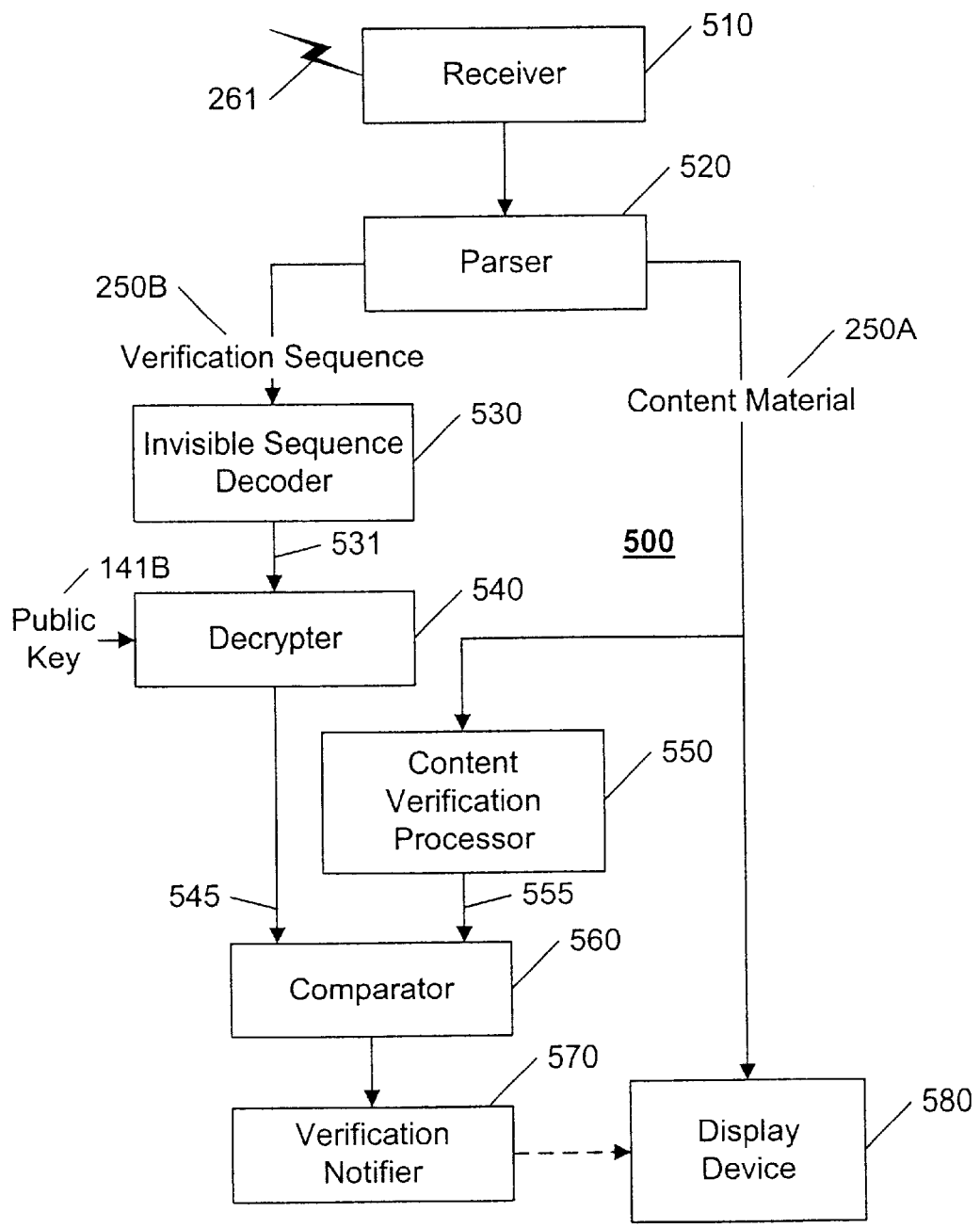
FIG. 5 illustrates an example block diagram of an invisible watermark decoder in accordance with this invention.

FIG. 5 illustrates an example block diagram of an invisible watermark decoder 500 in accordance with this invention. A receiver 510 receives the transmitted document 261 (of FIG. 2) that comprises content material 250A and an invisibly encoded verification sequence 250B. A parser 520 segregates the received document 261 into these segments 250A, 250B. The parser 520 effects the segregation based on the techniques used to delineate the segments 250A, 250B, as discussed above with respect to FIG. 2. The content material 250A is displayed directly on a display device 580. Note that the term "display device" is used generically; the device 580 may be portable or stationary, and may comprise a display monitor such as in a TV or of a PC, PDA, pager, a printer, a television, and so on, and may also include audio or other capabilities. The invisible sequence decoder 530 decodes the invisible sequence 250B based on the method used to encode the watermark, as discussed above with respect to FIGS. 3A, 3B, and 4, and produces a decoded watermark 531. The decrypter 540 decrypts the watermark 531 using a public key 141 B that corresponds to the private key 141A (FIGS. 1 and 2) that was used to encrypt the content verification parameter.

The comparator 560 compares the decrypted content verification parameter 545 to a content parameter 555 that is produced by a content verification processor 550. The content verification processor 550 performs the same function as the content verification processor 130 of FIG. 1. Therefore, if the content material 250A of FIG. 5 is identical to the content material 250A of FIG. 2, as it should be, the content parameter 555 that is produced by the content verification processor 550 is identical to the decrypted content verification parameter 545. The verification notifier 570 notifies the user of the results of the comparison, optionally as a communication via the display device 580.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in FIG. 2, the creation of the invisible watermark may be effected within the transmitter 260, and appended to the document 250 to form the transmission 261, leaving the original document 250 unaffected. In like manner, a separate document 250' may be created that includes the original document 250 plus an appended invisible watermark 250B, without affecting the original document 250. Also note that the principles of this invention may be combined with other invisible encoding techniques. For example the content document 250A may contain invisible encodings that affect the appearance of the document 250A on the display device 580, using the principles presented in the aforementioned copending U.S. patent application "Invisible Encoding of Attribute Data in Character Based Documents and Files", U.S. Ser. No. 09/333,632, filed Jun. 15, 1999 for Keith Ahern. Similarly, copending U.S. patent application "Script Embedded in Electronic Documents as Invisible Encoding", U.S. Ser. No. 09/456,987. filed Dec. 8, 1999 for Keith Ahem, presents the encoding of scripts via invisible encodings, and copending U.S. patent application "Invisible Encoding For Control of Delivery", U.S. Ser. No. 09/425,652, filed Sep. 22, 1999 for Keith Ahem, presents the encoding of document delivery options via invisible encodings, and are incorporated by reference herein.

The particular-structures and functions presented in the figures are for illustrative purposes. A variety of system configuration and optimization features will be evident to one of ordinary skill in the art in view of this disclosure, and are included within the scope of the following claims.

I claim:

1. An encoder for encoding meta-information that is associated with a document, the encoder comprising
an invisibility encoder that is configured to receive the meta-information and to generate therefrom a group of meta-information characters that are invisible when rendered together with the document.

2. The encoder of claim 1, further including
a meta-information generator that is configured to receive the document and to generate therefrom the meta-information.

3. The encoder of claim 2, wherein the meta-information generator comprises:
a content verification processor that provides a parameter corresponding to a content of the document, and
an encrypter, operably coupled to the content verification processor, that encrypts the parameter to form the meta-information.

4. The encoder of claim 1, wherein
the invisibility encoder is further configured to combine the group of meta-information characters with the document.

5. The encoder of claim 1, wherein the group of meta-information characters corresponds to a binary representation of the meta-information.

6. A method of facilitating an encoding of meta-information, the method comprising:
enabling a generation of a group of meta-information characters that are invisible when rendered together with a document related to the meta-information, the group of meta-information characters corresponding to the m eta-information.

7. The method of claim 6, further including:
enabling a generation of the meta-information, based on a content of a document.

8. The method of claim 7, wherein enabling the generation of the meta-information includes:
enabling a determination of a parameter corresponding to a content of the document, and
enabling an encryption of the parameter to form the meta-information.

9. The method of claim 6, further including
enabling an attachment of the group of mete-information characters to the document.

10. The method of claim 6, wherein the group of meta-information characters corresponds to a binary representation of the meta-information.

11. A decoder comprising:
a receiver that is configured to receive a document comprising content material and a group of meta-information characters that are invisible when rendered together with the document, the group of meta-information characters corresponding to meta-information that is associated with the document,
an invisibility decoder, operably coupled to the receiver, that is configured to decode the group of meta-information characters to form the meta-information.

12. The decoder of claim 11, wherein the meta-information includes a first content parameter, the decoder further including:
a processor that is configured to process the content material to form a second content parameter corresponding to the document, and
a comparator that is configured to compare the first content parameter and the second content parameter to facilitate a verification of the content material of the document.

13. The decoder of claim 12, further including
a decrypter that is configured to decrypt the meta-information to provide the first content parameter.

14. The decoder of claim 11, further including
a display device that displays the content material.

15. A method to facilitate a decoding of meta-information that is associated with a document, the method comprising:
enabling a receipt of the document comprising content material and a group of meta-information characters that are invisible when rendered together with the document, the group of meta-information characters corresponding to the meta-information,
enabling a decoding of the group of meta-information characters to form the meta-information.

16. The method of claim 15, wherein the meta-information includes a first content parameter, and the method further includes:
enabling a processing of the content material to form a second content parameter corresponding to the document, and
enabling a comparison of the first content parameter and the second content parameter to facilitate a verification of the content material of the document.

17. The method of claim 16, further including
enabling a decryption of the meta-information to provide the first content parameter.

18. An encoded document comprising:
content material, and
a group of meta-information characters that are invisible when rendered together with the content material,
the group of meta-information characters corresponding to meta-information that is associated with the content material.

19. The encoded document of claim 18, wherein the group of meta-information characters corresponds to a sequence of invisible character codes that correspond to a binary representation of the meta-information.

20. The encoded document of claim 18, wherein the group of meta-information characters include at least one of: a space character, a line-feed character, a tab character, a carriage-return character, and a back-space character.

* * * * *